June 3, 1958 J. J. BILLIN 2,837,596

GENERATION OF SYNCHRONISING PULSES
ESPECIALLY FOR TELEVISION
Filed Feb. 4, 1955

Inventor
J. J. Billin
By Glascock Downing & Seebold
Attys.

2,837,596

GENERATION OF SYNCHRONISING PULSES ESPECIALLY FOR TELEVISION

James John Billin, Isleworth, England, assignor to Electric & Musical Industries Limited, Hayes, England, a company of Great Britain Application February 4, 1955, Serial No. 486,233

Claims priority, application Great Britain March 26, 1954

3 Claims. (Cl. 178—5.4)

Figures 1, 2:
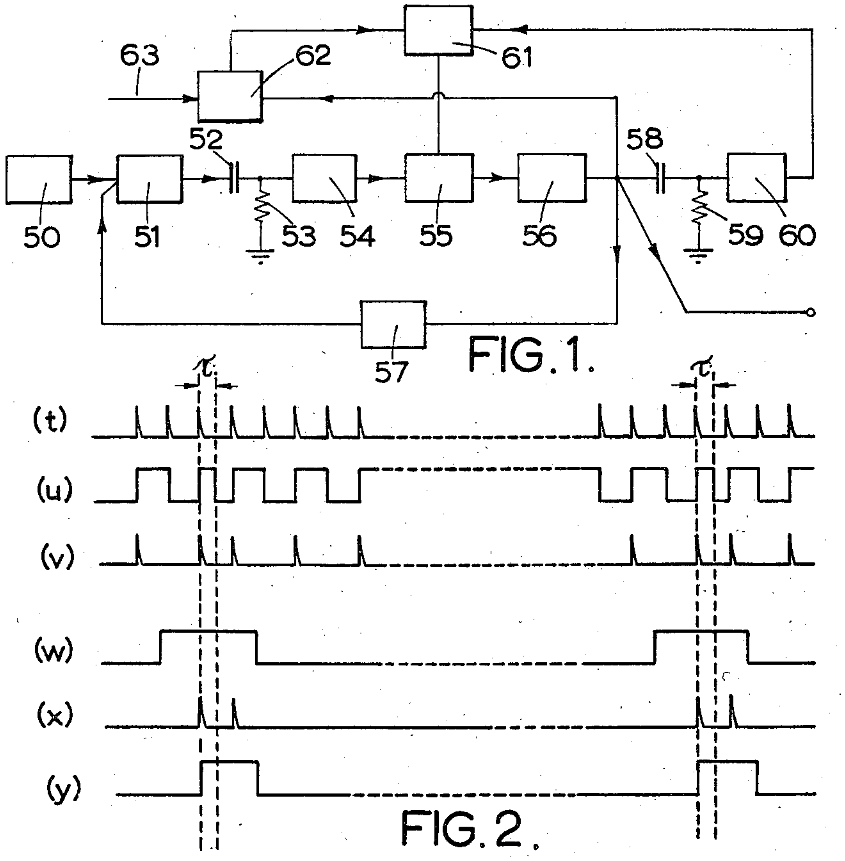

This invention relates to the generation of synchronising pulses especially for television.

Interlaced scanning is almost universally employed in television apparatus to achieve a flicker-free field repetition frequency with an economical signal band width. Normally two fields are interlaced to produce each complete television picture and in most practical television systems, each field comprises the same integral number of lines plus half a line. This implies that each television picture comprises an odd number of lines and usually the synchronising pulses for controlling the scanning are generated by starting with pulses of twice line frequency. From these pulses the line synchronising pulses are produced by dividing by two and the field synchronising pulses are produced by dividing by the number of lines in each complete picture. It is, moreover, desirable that field frequency should be near to mains frequency so as to reduce the degree of smoothing required in television receivers and thereby simplify the necessary smoothing circuits, and in general the pulses of twice line frequency are controlled in some way to maintain the desired field frequency. The line frequency in such an arrangement will therefore vary if mains frequency varies but in some cases it is desirable that line frequency should not be locked to mains frequency.

This requirement is encountered for example in systems of colour television such as the N. T. S. C. system, in which luminance information and chrominance information are caused to modulate different carrier waves whose frequency separation is within the luminance modulation frequency band. For instance, the chrominance-modulated carrier wave sidebands may be radiated as a subsidary carrier wave on the luminance-modulated carrier wave. Since the frequency separation of the two carrier waves is within the luminance modulation frequency band, interference signals corresponding to the frequency difference appear as a dot pattern on pictures reproduced from the luminance waveform and, in order to make the dot pattern virtually invisible, it has been proposed to make the difference frequency, hereinafter called the chrominance sub-carrier frequency, an odd integral multiple of half line frequency and when this is so the dot patterns in successive lines are of opposite phase so that their effect is to a large extent self-cancelling. The chrominance information may comprise two colour signals which are caused to modulate two phases of the chrominance carrier wave, and in that case in order to facilitate detection of the chrominance-modulated sub-carrier wave at receivers, it is desirable that the chrominance sub-carrier frequency should be highly constant. In practive, the oscillator for generating the chrominance sub-carrier wave may be crystal controlled. This conflicts with the practice of allowing field frequency and line frequency to vary in response to variations of mains frequency, which may amount to ±2 percent. If the field frequency is maintained constant so as to maintain a constant odd integral multiplying factor between half line frequency and the chrominance sub-carrier frequency, unsatisfactory reception of the luminance information by monochromatic receivers (and in particular by monochromatic receivers of current design) would result. It is known that in monochromatic receivers of current design picture displacement is liable to occur when the field frequency is appreciably different from mains frequency, due to insufficient smoothing of power supplies and associated factors.

The object of the present invention is to reduce difficulties such as those indicated.

A method and apparatus for reducing such difficulties is described in the specification of United States patent application No. 471,866.

The present invention provides an alternative method and apparatus for reducing such difficulties.

According to the present invention there is provided apparatus for generating synchronising signals for colour television, comprising a source of reference oscillations having a frequency equal to the difference between the frequencies of a luminance carrier wave and a chrominance carrier wave, means for deriving line synchronising signals, means for deriving field synchronising signals having a fixed frequency relationship with said line synchronising signals, control means for varying the frequency of said line and field synchronising signals in response to a reference frequency independent of that of said first reference oscillations, and means for restricting said frequency changes to values corresponding to odd integral multiple relationships between half the frequency of said line synchronising pulses and the frequency of said first reference oscillations.

Figure 3:
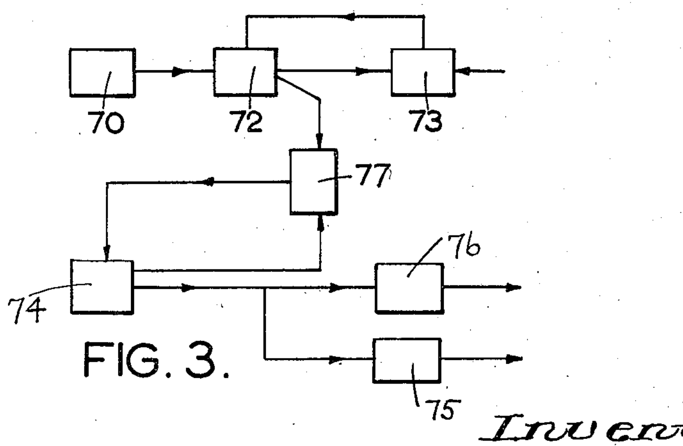

In order that the invention may be clearly understood and readily carried into effect, the invention will be described with reference to the accompanying drawings, in which:

Figure 1 illustrates diagrammatically and mainly in block form one example of a dividing circuit which can be used in carrying out the present invention, Figure 2 comprises waveform diagrams explanatory of the operation of Figure 1, and Figure 3 illustrates diagrammatically, and in block form one example of pulse generating apparatus according to the present invention and embodying a dividing circuit such as shown in Figure 1.

In describing the invention with reference to the drawings, a colour television system will be assumed in which the chrominance information is caused to modulate a subsidiary carrier wave having a frequency different from the principle carrier wave for the luminance information equal to an odd integral multiple of half the line frequency. It will be assumed moreover that each field comprises the same integral number of lines plus half a line so that odd line interlacing is produced. In the forms of the invention to be described a substantially fixed frequency relationship is maintained between the frequency of the line synchronising pulses and the frequency of the field synchronising pulses, this frequency relationship being such as to produce the required interlace. Furthermore, field frequency is maintained within a predetermined small difference with mains frequency and the variations in field frequency, and therefore of line frequency, which are required so as to follow variations in mains frequency are such as to preserve an odd integral multiple relationship between the chrominance sub-carrier frequency and line frequency. This means that variations in line frequency responsive to mains frequency variations must be such as to cause said odd integer to take different values. In other words, it is necessary to preserve a discrete relationship between the frequency of the line synchronising pulses and some reference frequency which is not locked to mains frequency. By a "discrete relationship" is meant a relationship which can be satisfied only by discrete values of the frequency of the line synchronising pulses, so that if the latter frequency is not fixed any changes in it must be from one of said discrete values to another.

Assume for example that the chrominance sub-carrier frequency is 2,657,812.5 cycles per second in a 405 line television system. If the standard field frequency is 50 cycles per second corresponding to a nominal mains frequency of this value the ratio of the chrominance sub-carrier frequency to half the line frequency is 525. If the mains frequency varies it is arranged that the field frequency varies to follow the mains frequency within permissible limits but at the same time to maintain the aforesaid ratio equal to $525 \pm 2n$ where $n$ is an integer. If the mains frequency variations have the limits $\pm 2$ percent then $n$ requires to have a value between 0 and 5.

According to one example of this form of the invention, an oscillation of fixed frequency is generated by a crystal controlled oscillator to serve as the chrominance sub-carrier wave, the oscillator frequency being for example 2,657,812.5. This oscillation is applied to a frequency dividing circuit which has a variable division ratio. The frequency dividing circuit is arranged to produce pulses of line frequency and pulses of twice line frequency, and field frequency pulses are derived from the twice line frequency pulses in known manner. These field frequency pulses are then compared with the mains frequency and the difference, depending on its sign, is arranged to decrease or increase the division ratio of the frequency dividing circuit in such a way as to maintain the field frequency equal to the mains frequency within a permissible tolerance. Moreover, the division ratio of the frequency dividing circuit is varied in discrete steps so that half the line frequency always bears an odd integral multiple relationship with the chrominance sub-carrier frequency, the ratio of the chrominance sub-carrier frequency to half the line frequency being within the limits $525 \pm 10$. A suitable form of variable-ratio frequency dividing circuit, which can divide by a variable odd integer is described in British patent application No. 24,112/54 filed by K. G. Huntley.

Figure 1 of the drawings illustrates the general construction of a frequency dividing circuit according to the said co-pending application, and referring to the drawing the reference numeral 50 indicates a master oscillator which generates pulses of a reference frequency, such as represented by the waveform $t$ in Figure 2. The frequency of the pulses $t$ are it is assumed locked to the chrominance sub-carrier frequency, and these pulses are fed to a binary counter circuit 51 which produces output pulses $u$ of half the frequency, subject to one irregularity which will be explained later. The pulses $u$ are fed to a differentiating circuit, consisting of capacitor 52 and resistor 53, followed by a clipping circuit 54 which removes the spikes corresponding to the ends of the pulses $u$ leaving the spikes corresponding to the beginnings of the pulses $u$. The output from device 54 is represented by ($v$) in Figure 2 and it is fed as one of the inputs to a coincidence gate 55 which, as is well known, requires the presence of input pulses from both of two sources in order that it shall generate an output. The output from gate 55 has a waveform as represented by ($x$) in Figure 2 and is used to trigger a flip-flop 56, the duration of the unstable state of which determines the duration of the output pulses of the circuit. In addition to forming the output pulses, the pulses from 56 are fed through a delaying device 57 which delays the pulses by an interval $\tau$ less than one period of the pulse $u$ and the delayed pulses are applied as an additional input to the trigger circuit 51. It is these pulses which cause the irregularity above-mentioned. Pulses from the flip-flop 56 are also fed to a differentiating circuit 58, 59 and clipping circuit 60 similar to 52, 53, 54 except that it leaves the spikes corresponding to the end of pulses fed into it, that is corresponding to the end of the pulses $y$. The output from the device 60 is applied in turn to a flip-flop 61, the duration of the unstable state of which determines the minimum interval between successive output pulses. The output of the flip-flop 61 is represented by waveform $w$ and forms the second input to coincidence gate 55 so that the gate can only be opened during intervals in which the flip-flop has reverted to its stable state. The gate 55 is in fact only opened on coincidence of pulses $v$ and $w$. The pulses generated in the output of the flip-flop 56 are as aforesaid the required pulses. At the termination of each pulse $y$ the flip-flop 61 is triggered into its unstable state by the pulse set up by the device 60 and the gate 55 is then closed for the duration of the unstable state of the flip-flop 61. At the end of this interval the flip-flop 61 returns to its stable state and the gate 55 then opens in response to the next pulse $v$ to arrive, whereupon the whole cycle is repeated as described. It will be seen that in every cycle of the output pulses one additional pulse is fed to the binary counter circuit 51 via the delay device 57, and for this reason the circuit is caused effectively to divide the reference frequency by an odd number. Thus the flip-flop 56 can only be triggered when a pulse derived from the circuit 51 is applied thereto via the gate 54 and since the circuit 51 serves as a divide-by-two circuit this, in the absence of steps to the contrary, could only occur when an even number of pulses has been applied to the circuit 51. In every field period, however, one pulse is fed to the circuit 51 through the delaying device 57, with the consequence that the flip-flop 56 will always be triggered when an odd number of pulses have been applied to the circuit 51 from the master oscillator 50. The circuit is therefore one which always effectively divides the reference frequency by an odd number rather than an even number. The value of this odd number is set according to the duration of the unstable state of the flip-flop 61, and in the present example is variable to maintain the frequency of the pulses from 56 close to a value which, variable in response to field frequency, is the desired value for half line frequency from the point of view of smoothing difficulties.

Moreover the duration of the unstable state of the flip-flop 61 is arranged to be variable under the control of another signal which is of lower frequency than the aforesaid reference frequency but which is not locked in frequency to said reference frequency, so that the pulses $y$ have a frequency which remains within a predetermined difference from the frequency of said other signal. This control is effected by means of a frequency discriminator circuit represented by the rectangle 62 which receives an input of control signals of lower frequency as represented by the arrow 63 and receives a second input consisting of the signals produced by the flip-flop 56. As will appear, the frequency of the control signals varies in response to mains frequency variations. The difference in frequency between the two sets of signals applied to the discriminator 62 is employed to vary in known manner the duration of the unstable state of the flip-flop 61, such variation being for example effected by adjusting the bias potential applied to the time constant circuit of the flip-flop. Any such variations of the flip-flop circuit 61 do not however destroy the condition that there is an odd integral multiple relationship between the pulses $y$ and the frequency of the control signals from 50, namely the chrominance sub-carrier frequency. The frequency discriminator 62 may be of a conventional construction, such as described for example in British patent specification No. 458,161.

The use of a frequency discriminator to control the frequency of the pulses $y$ is advantageous since it permits a much greater phase tolerance in the pulses to be allowed, whilst holding the frequency sufficiently close to the frequency of the control signals of lower frequency to avoid difficulties due to inadequate smoothing. The phase tolerances may for example be of the order of ±45° with respect to the control signal of lower frequency.

In Figure 3 reference 70 represents a master oscillator generating signals having the frequency of the chrominance sub-carrier. These signals then form the input to the frequency dividing circuit 72 such as described in Figure 1 and this dividing circuit is arranged to divide by an odd integer to produce output pulses whose frequency is half line frequency. Moreover the division ratio of this counter is arranged to vary in even integral steps in dependence upon variations in mains frequency. For example, such variations can be achieved by a frequency discriminator circuit 73 which is similar to circuit 62 of Figure 1 and compares mains frequency with the field frequency corresponding to the half-line frequency pulses set up by 72. For the purpose of effecting the comparison with mains frequency, signals of the field frequency corresponding to the half line frequency pulses set up by 72 can be derived in any suitable manner from the output of 72. A circuit comprising a further master oscillator 74 arranged to generate signals of twice line frequency and from these signals line frequency synchronising pulses are derived by a circuit 75 which divides by two. Moreover field synchronising signals are derived from a circuit 76 which divides the frequency of the signals from 74 by the appropriate value to produce the field frequency. The circuit 76 may also be of the construction illustrated in Figure 1 without however any provision for frequency control. To allow the frequencies of the line synchronising pulses and of the field synchronising pulses derived from 75 and 76 to vary so as to maintain the frequency of the latter pulses within a predetermined difference from mains frequency and to maintain the necessary discrete relationship between the frequency of the former pulses and the frequency of the master oscillator 70, the oscillator 74 is controlled in phase by the output of the divider circuit 72. The phase control means is represented in the drawing by a rectangle 77 which receives an input from the oscillator 74 and a second input from the divider circuit 72 and it controls the phase of the oscillator 74 in any known manner in dependence upon phase differences between the two signals. For example, phase control means 77 may be of the construction used in television receivers which employ flywheel synchronisation, but arranged to have a relatively long time constant so that transitions between successive discrete frequencies of the line synchronising pulses takes place relatively slowly. This is preferable, because sudden transitions of line frequency may cause temporary loss of synchronisation in receivers, especially receivers employing flywheel synchronisation.

In the frequency dividing circuit shown in Figure 1, the pulse which is fed back to the binary counter circuit to produce the odd integral divisor, may be arranged to inhibit an input pulse rather than to insert an extra one.

In another example of the invention the transmitter is provided not only with a source of oscillations of fixed frequency to serve as the chrominance sub-carrier wave but also with a plurality of other sources of oscillations whose frequencies are respectively the same integral multiple of a series of half line frequency values. A selector switch is provided which applies the oscillations from said sources to a circuit having a constant division ratio and which is arranged to produce oscillations of the field frequency corresponding to the oscillations selected by the switch. The field frequency oscillations produced by the dividing circuit are then compared with oscillations of mains frequency and the difference, it it exceeds a predetermined tolerance, is caused to operate the selector switch by means of a relay so that oscillations from different sources are tried in turn until the difference between the compared oscillations is reduced to within the aforesaid tolerance.

While the invention has been described as applied to arrangements in which odd line interlaced scanning is employed, the invention may be employed to produce "*n*-order" interlacing. To produce such interlacing, successive field synchronising pulses must differ in timing with respect to line synchronising pulses by $1/n$th of the time interval between successive line scanning pulses, where $n$ is an integer and denotes the order of interlacing.

Moreover whilst the invention is especially applicable to the generation of synchronising pulses for transmission with colour television signals, the invention is also applicable to other cases, such for example as industrial television, where adaptability is an important consideration.

What I claim is:

1. Apparatus for generating synchronising signals for colour television comprises a source of first reference oscillations having a frequency equal to the difference between the frequency of a luminance carrier wave and a chrominance carrier wave, means for deriving line synchronising signals, means for deriving field synchronising signals having a fixed frequency relationship with said line synchronising signals, a source of second reference oscillations having a frequency subject to variation relative to the frequency of said first reference oscillations, means for deriving a control signal in response to relative variations between the frequency of said first reference oscillations and the frequency of said second reference oscillations, and control means responsive to said control signal for changing the frequency of said line and field frequency signals in discrete steps, each step corresponding to an odd integral multiple relationship between the half the frequency of said line synchronising signals and the frequency of said first reference oscillations.

2. Apparatus for generating synchronising signals for colour television, comprising a source of first reference oscillations having a frequency equal to the difference between the frequencies of a luminance carrier wave and a chrominance carrier wave, a frequency dividing circuit for dividing said first reference oscillations to derive pulses whose frequency is an odd integral sub-multiple of the frequency of said first reference oscillations, means for deriving line synchronising signals having twice the frequency of said pulses, means for deriving field synchronising signals having a fixed frequency relationship with said line synchronising signals, a source of second reference oscillations having a frequency subject to variation relative to the frequency of said first reference oscillations, control means responsive to relative variations between the frequency of said first reference oscillations and the frequency of said second reference oscillations for varying the division ratio of said dividing circuit in integral steps, to maintain the frequency variations of said line and field synchronising signals relative to said second reference oscillations within a predetermined tolerance.

3. Apparatus for generating synchronising signals for colour television, comprising a source of first reference oscillations having a frequency equal to the difference between the frequencies of a luminance carrier wave and the chrominance carrier wave, a frequency dividing circuit for dividing said first reference oscillations to derive pulses whose frequency is the odd integral sub-multiple of the frequency of said first reference oscillations, means for deriving line synchronising signals having twice the frequency of said pulses, means for deriving field synchronising signals having a fixed frequency relationship with said line synchronising signal, means for deriving a first comparison signal having fixed timing relative to said pulses, means for deriving a second comparison signal having a fixed timing relative to said line synchronising signals, phase comparison means for deriving a control signal responsive to relative variations between the phase of said first comparison signal and the phase of said second comparison signal, and means for varying the division ratio of said dividing circuit in integral steps in response to said control signal to maintain the frequency variations of the line and field synchronising signals relative to said second reference oscillations within a predetermined tolerance, said phase comparison circuit having a relatively long time constant whereby substantial phase slip may occur between said line and field synchronising signals and said second reference oscillations.

References Cited in the file of this patent

UNITED STATES PATENTS

| | | |
|---|---|---|
| 2,655,556 | Abelson | Oct. 13, 1953 |
| 2,672,510 | Euslein | Apr. 16, 1954 |
| 2,704,307 | Gillette | Mar. 15, 1955 |